United States Patent [19]

Linnér

[11] Patent Number: 4,511,426
[45] Date of Patent: Apr. 16, 1985

[54] HOT GAS SEALING DEVICE

[75] Inventor: Hans Linnér, Kalmar, Sweden

[73] Assignee: Norden Packaging Machinery AB, Kalmar, Sweden

[21] Appl. No.: 567,318

[22] Filed: Dec. 30, 1983

[30] Foreign Application Priority Data

Jan. 20, 1983 [SE] Sweden ............................ 8300277

[51] Int. Cl.³ ............................................. B32B 31/26
[52] U.S. Cl. ..................................... 156/497; 53/373;
53/477; 156/499; 219/531
[58] Field of Search ................. 53/373, 477; 156/497,
156/499; 165/1, 108, DIG. 2; 219/531

[56] References Cited

U.S. PATENT DOCUMENTS

| 3,140,571 | 7/1964 | Dorper et al. | 53/477 |
| 3,980,515 | 9/1976 | Reil et al. | 156/497 |
| 4,019,946 | 4/1977 | Greisman | 156/497 |
| 4,350,003 | 9/1982 | Greenawalt et al. | 53/373 X |
| 4,394,204 | 7/1983 | Hutcheson | 156/499 X |

Primary Examiner—Robert Dawson
Attorney, Agent, or Firm—Holman & Stern

[57] ABSTRACT

A device for hot air welding, comprising a nozzle for activation of a sealing area around an opening at the inside of a hollow body. The nozzle has a slot device for directing a flow of air out through the opening for activating the sealing area when the nozzle is in the operative position thereof. Means are arranged for cooling the hollow body externally around the sealing area. There are also provided means for recirculation of the gas.

5 Claims, 6 Drawing Figures

4,511,426

HOT GAS SEALING DEVICE

FIELD OF THE INVENTION

The present invention relates to a device for welding, preferably sealing of hollow bodies, for instance plastic tubes or laminate tubes. More precisely, the invention relates to an arrangement for welding/sealing by using a hot gas, for instance hot air.

BACKGROUND OF THE INVENTION

The problem behind the invention is to find a cheaper and more useful method than conventional high frequency welding contact heat jaw welding and radiation heat welding and which is useful for both plastic and metal foil laminates. The problem behind the invention also is to find an arrangement for internal welding of hollow bodies, preferably for sealing of openings in flexible packaging containers, for instance for transverse sealing of tubes, i.e. forming a seam in a direction crosswise the longitudinal axes of the tube.

Of the conventional methods, the contact heat welding is an indirect method where heat is supplied from the exterior by heated jaws. When radiation heat welding is applied on tubes, radiation elements provide a weld joint by melting the tube end at the same time as the tube is compressed by some kind of tool. High frequency welding means activation of the welding area by heat production directly in such area whereby transfer losses are eliminated. However, it has turned out that some times high frequency welding implies practical problems and, additionally, that such method, like the other two methods, is rather expensive.

Therefore, the object of the invention is to find a more advantageous alternative in the type of application mentioned.

SUMMARY OF THE INVENTION

The invention provides a device for hot gas welding, preferably hot air sealing. The device comprises: a nozzle for activating a sealing area around an opening at the inside of a hollow body, for instance a tube; a slot device in said nozzle arranged for directing a flow of gas out through the opening for activating said sealing area when the nozzle is in the operative position thereof; means for cooling the hollow body externally around the sealing area; means at the said opening of the hollow body for recirculation of the gas stream; and a gas guiding element of a heat insulating material, acting as a heat shield for the goods within the hollow body. Preferably, said means for cooling the hollow body externally comprises a loop containing a cooling medium.

In order to achieve a uniform activation of the welding area and allow a simple construction, the slot of the nozzle preferably is formed as one or several circumferential slots.

The technique according to the invention especially is useful where the hollow body is a tube to be sealed in the transversal direction at the region of said opening. The nozzle co-operates with press jaws, in the operation direction of the machine preferably located after the nozzle in a filling/sealing machine equipped with at least one set of nozzles/press jaws.

The slot device for directing the gas stream may of course vary as to form. The device may for instance comprise a set of holes along the circumference of the nozzle.

DESCRIPTION OF A PREFERRED EMBODIMENT

Figure 1:
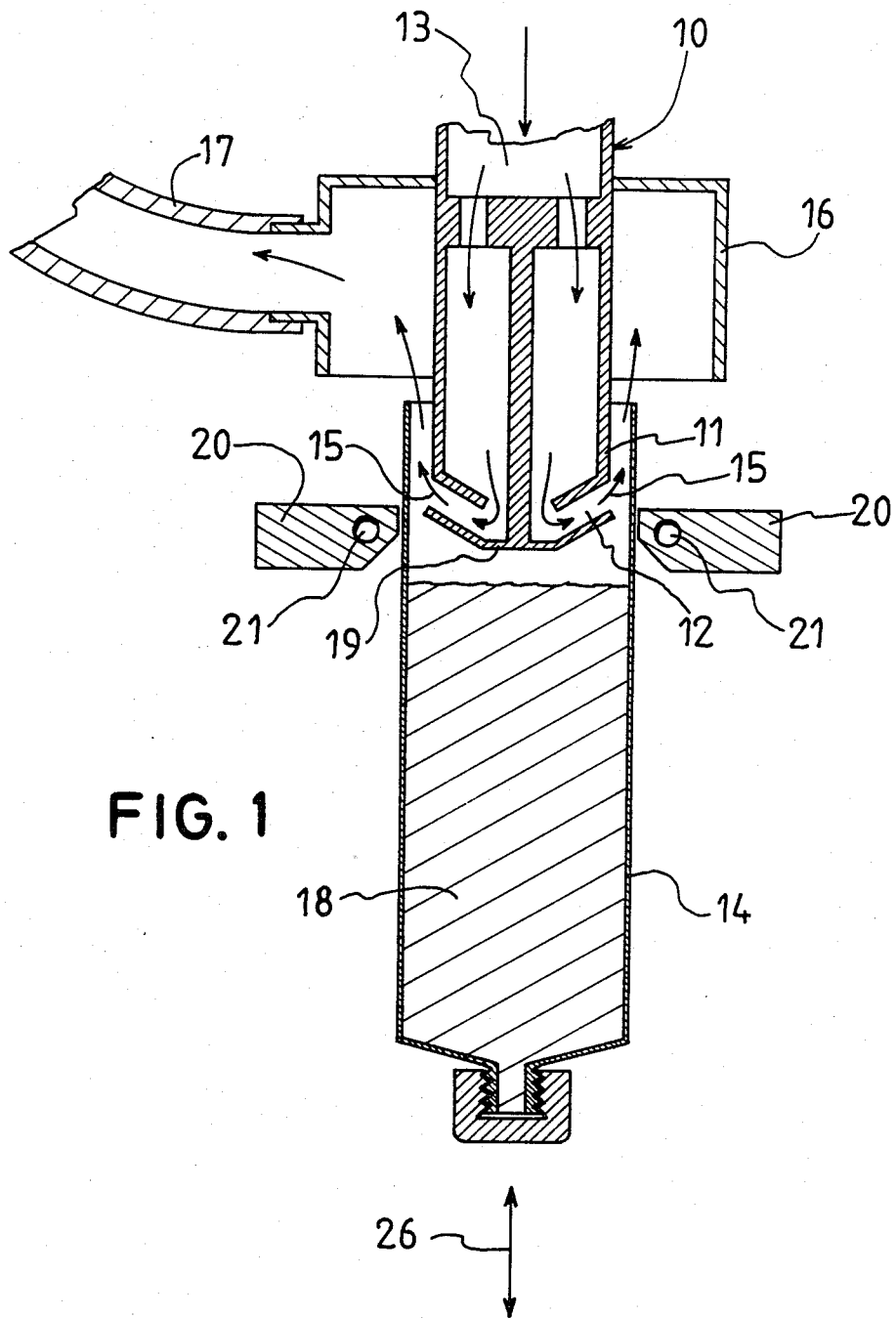
FIG. 1 in a schematic cross section view shows the nozzle in a operative position within a tube.
Figure 2:
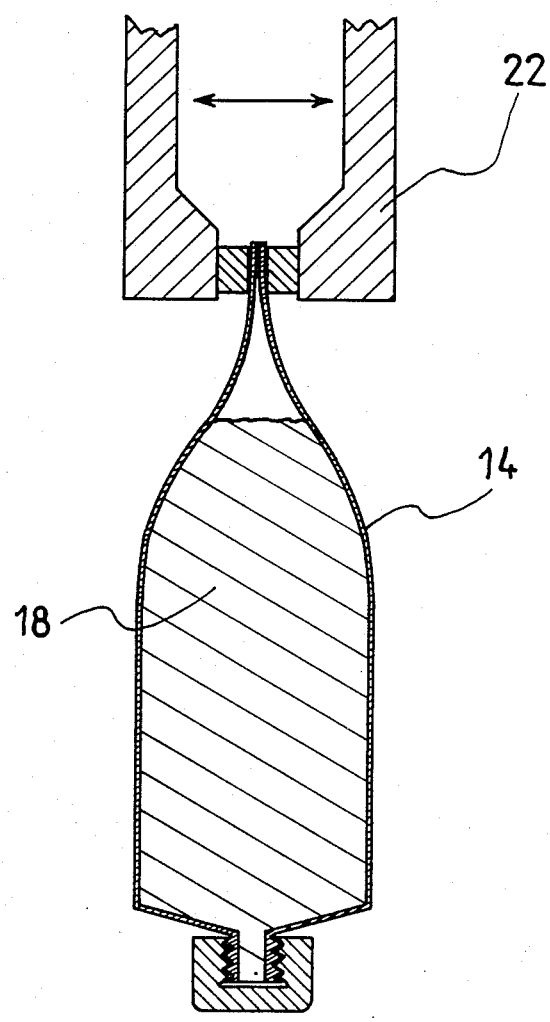
FIG. 2 shows the tube in FIG. 1 during compression for forming a transverse seam, FIG. 3 in a simplified partial view shows a tube in a sealing/filling machine in the heating position of the tube, or more precisely in the sealing area.

The nozzle generally indicated by the numeral 10 in FIG. 1 comprises a lower generally cylindric end 11 having a circumferential slot 12 acting as an outlet for hot air from a supply conduit 13. The slot 12 is directed obliquely upwards for striking with hot air a well defined area of the end of a tube 14 to be sealed in the transversal direction. The end 11 and tube 14 are dimensioned such that a circumferential slot having a constant width of approximately some millimetres, possibly centimetres at a maximum, is formed and allows a flow of air in the direction of the arrows 15.

The attack area of the flow of air at the inside of the end of the tube body 14 to be heat sealed is determined by the slot 12 and the insertion depth into the tube. The well defined area of attack is followed, in the flow direction of the air, by a collector housing 16 for the air flowing out from the tube. Via a conduit 17 the air is fed into a recirculation system having an appropriate arrangement (not shown) for the return flow of air at an appropriate temperature level through the supply conduit 13.

In FIG. 1 the tube 14 is filled with a product 18 and preferably is supported displaceable in the vertical direction in a filling/sealing machine, as indicated by the double arrows 6 in FIG. 1. Such a positioning determines the insertion depth of the end of the nozzle 11. In order to avoid heat transfer to the goods, the end 11 preferably is provided with a heat shield 19 formed for guiding a gas stream and possibly comprising a heat insulating material and forming the portion of the hot air slot 12 facing the goods.

Alternatively, the relative vertical displacement may be obtained by making the nozzle movable in the vertical direction.

A centering sleeve 20 surrounds the nozzle 10 in the area of the end 11 and as shown in FIG. 1 the sleeve may be provided with a loop 21 for a cooling medium. The loop forms an essential part of the system and provides for a well controlled environment at the external side of the welding area. From an esthetic point of view such temperature controlled environment is highly interesting. The cooling during heat activation of the inside of the tube also contributes to a well defined sealing area.

Figure 3:
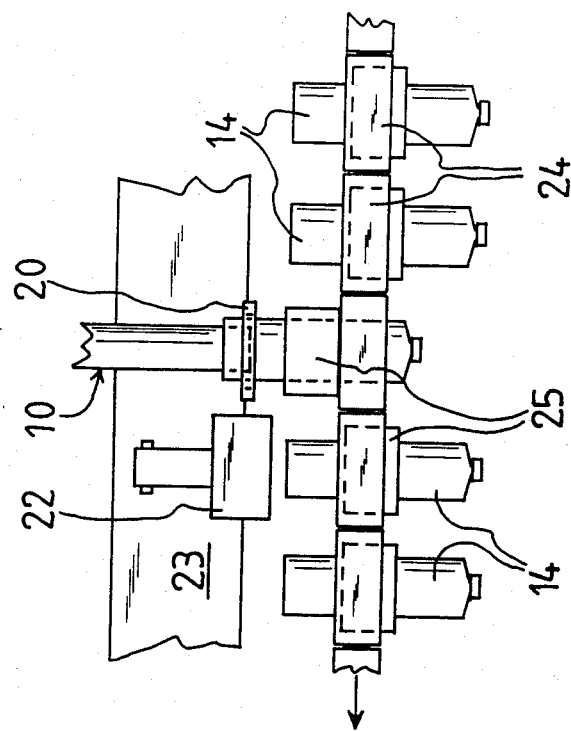

The nozzle 10 which is intended for a machine of the type schematically shown in FIG. 3 co-operates with press jaws 22 following directly after the nozzle 10 in the operation direction of the machine. The jaws provide the necessary sealing pressure and are stationary in the machine stand 23 as is the nozzle 10 in the actual embodiment. In one and the same machine, preferably, there are several sets of nozzles/press jaws 10, 22 operating in parallel on tubes forwarded in the machine by a conveyor system.

Figure 4:
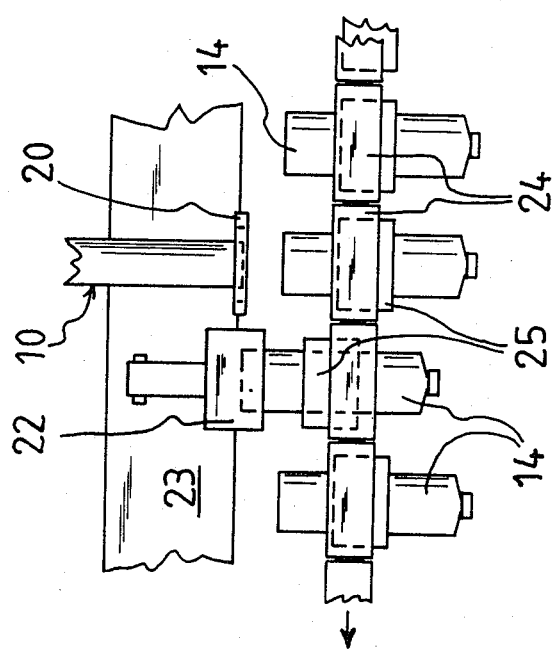
FIG. 4 shows the tube in the machine according to FIG. 3, but in a compression position for forming a transverse seam, generally combined with cooling of the sealing area.

In the embodiment according to FIGS. 3 and 4 tubes 14 are transported intermittently by an endless conveyor 24 to the intended position by using appropriate guiding devices (not shown). The displacement of the tubes in the vertical direction for positioning of the tube end relative the nozzle is obtained by stationary guides (not shown) which operate displaceable brackets 25 forming part of the conveyor 24.

Figure 5:
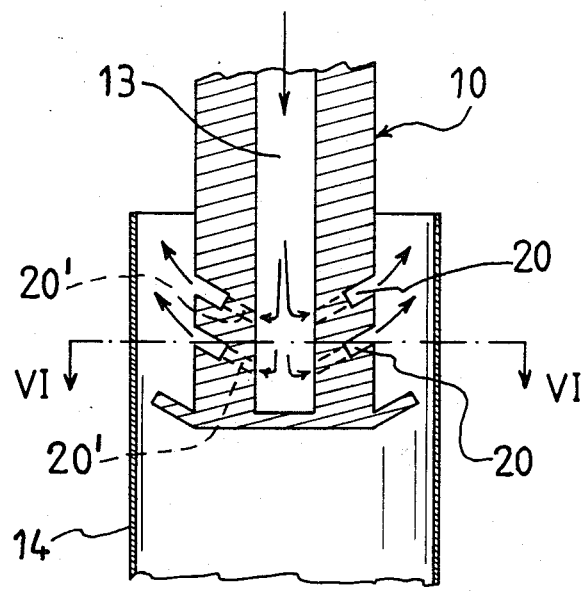
FIG. 5 shows an alternative slot design of the nozzle.
Figure 6:
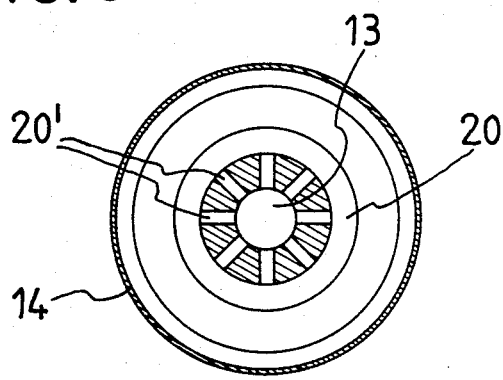
FIG. 6 is a section view along line VI—VI in FIG. 5.

In FIGS. 5 and 6 there is shown an alternative slot embodiment. The slot 20 is a circumferential double slot 20 having an axial distance between individual slots. Each one of the slots communicates with the supply conduit 13 via a hole 20'.

As a further alternative to the basic embodiment it is possible to replace the slot by an appropriate set of holes.

The positioning of the nozzle slot/set of holes for directing the air flow out through the opening implies—it has turned out—an advantageous temperature distribution in the tube. The venturi effect arising due to the outflowing hot air implies that the air flow sucks out also some of the air at the interface of the goods in the tube. This means that the goods is protected against a high temperature due to the venturi effect.

We claim:

1. A device for hot gas welding, preferably hot air sealing, comprising:
    a nozzle for activating a sealing area around an opening at the inside of a hollow body, for instance a tube,
    a slot device in said nozzle arranged for directing a flow of gas out through the opening and activating said sealing area when the nozzle is in the operative position thereof,
    means at the opening of the hollow body for recirculation of the flow of gas,
    means for cooling the hollow body externally around the sealing area comprising a loop containing a cooling medium, and
    a gas guiding element of a heat insulating material, acting as a heat shield for the goods within the hollow body.

2. A device as in claim 1, wherein the slot of the nozzle comprises at least one circumferential slot.

3. A device for hot gas welding a tube by forming a transversal seal at one end of the tube, comprising:
    a nozzle for activating a sealing area at the inside of the tube opening at said one tube end,
    a slot device in said nozzle for directing a flow of gas out through the opening and activating said sealing area when the nozzle is in the operative position thereof,
    means for cooling the tube externally around the sealing area comprising a loop containing a cooling medium,
    a gas guiding element of heat insulating material acting as a heat shield for the goods within the hollow body, and
    press jaws compressing the tube end after the nozzle has been withdrawn.

4. A device as in claim 3, wherein the press jaws are located after the nozzle when viewed in the operational direction of the device.

5. A device as in claim 3, wherein the slot device comprises a set of holes along the circumference of the nozzle.

* * * * *